Fig. 2

INVENTORS
PAUL J. LYNCH
ROBERT J. MODAHL

INVENTORS
PAUL J. LYNCH
ROBERT J. MODAHL
BY Holmes & Andersen
ATTORNEYS

INVENTORS
PAUL J. LYNCH
ROBERT J. MODAHL

BY *Holmes & Andersen*
ATTORNEYS

United States Patent Office 3,296,814
Patented Jan. 10, 1967

3,296,814
ABSORPTION REFRIGERATION SYSTEMS, METHODS, AND ABSORBENT COMPOSITIONS
Paul J. Lynch, La Crosse, and Robert J. Modahl, Galesville, Wis., assignors to The Trane Company, La Crosse, Wis., a corporation of Wisconsin
Filed Oct. 28, 1965, Ser. No. 505,489
13 Claims. (Cl. 62—112)

This application is a continuation-in-part of application Serial No. 384,861, filed July 24, 1964, now abandoned.

The present invention relates to the art of heating and cooling and particularly to air conditioning employing a heat operated absorption refrigeration system. More particularly this invention relates to absorption refrigeration systems and processes and to absorbent refrigerant compositions for operation with high temperature heat sinks.

Absorbent refrigeration systems normally require the absorbent material to remain in liquid form throughout the cycle of operation and a refrigerant material adapted to have a liquid phase and vapor phase.

The usual absorption refrigeration system has a generator in which the absorbent, diluted with absorbed refrigerant, is heated to boil off some of the refrigerant. The refrigerant vapor flows to a condenser in which the refrigerant vapor is condensed to a liquid by heat exchange with an external cooling fluid maintained at a suitable temperature by a heat sink. The liquefied refrigerant flows through a throttle valve or equivalent regulating device to an evaporator which is kept at a reduced pressure so that the liquid refrigerant boils at a relatively low temperature and produces refrigeration. In the evaporator, the cold refrigerant absorbs heat from an external fluid which is circulated through the evaporator and is thereby cooled to substantially the evaporator temperature. This cooled external fluid is circulated to a refrigeration load.

The vaporized refrigerant from the evaporator flows to an absorber where it is absorbed by concentrated absorbent supplied from the generator. The absorption of refrigerant vapor maintains the low pressure in the evaporator. Since the concentrated absorbent was heated in the generator and the act of absorption also generates heat, the absorber must be cooled to suitable operating temperature by heat exchange with an external cooling fluid, the heat sink. From the absorber, the diluted absorbent passes to the generator to be concentrated by heating the absorbent to boil off some of the refrigerant and thus repeat the cycle. A pump is often used in the system to help return the diluted absorbent to the generator. Also, the diluted absorbent passing to the generator from the absorber is often put in heat exchange with the concentrated absorbent passing from the generator to the absorber. Absorption refrigeration systems are closed, and made as leakproof as possible to prevent the entrance of air or other external materials into the system or the escape of the operating materials from the system.

At the present time, absorption refrigeration systems for comfort air conditioning usually use an aqueous solution of lithium bromide as an absorbent and water as a refrigerant. Such systems when used for comfort air conditioning normally require maintaining in the evaporator a temperature of about 40° F. To maintain such temperature and low pressure in the evaporator, the concentration, temperature, and absorptive ability of the absorbent solution in the absorber must be sufficient to maintain a vapor pressure over the absorbent solution which is less than the vapor pressure of water at such temperature and pressure.

Currently, most large capacity absorption refrigeration systems for comfort air conditioning, in addition to using water as the refrigerant and an aqueous solution of lithium bromide as the absorbent, maintain the condenser and absorber at suitable operating temperatures by heat exchange with external cooling water. This cooling water acts as an intermediate heat transfer fluid and rejects heat to an air sink by means of a cooling tower. This intermediate heat transfer fluid is usually supplied to the absorber at a temperature of about 85° F.

With a higher temperature heat transfer fluid, the concentration of absorbent in the absorber must be greater in order for the higher temperature solution to have a vapor pressure less than that of water at 40° F. For intermediate heat transfer fluids having temperature of about 100° F., the risk of crystallization is so great that reliable operation of the system cannot be assured.

It has long been desired to reject heat from an absorption cycle employing an aqueous solution of a salt as an absorbent and water as a refrigerant by heat exchange directly to air. But this has not been practical with the absorbent salt solutions presently available. For such an air cooled system, ambient air temperatures of 95° F. to 115° F. are assumed for design purposes. For purposes of explanation, an ambient air temperature of 110° F. will be assumed. In order to keep the amount of heat transfer surface within economical limits, it is necessary that the process be operated at 20° higher than the heat sink or at 130° F. under the assumed condition of ambient air at 110° F. Furthermore, at such temperatures, the absorbent at the required concentration must be capable of remaining a liquid free from crystals and of having enough absorbing power to maintain the low vapor pressure required in the evaporator to keep the evaporator temperature at about 40° F.

Prior to the present invention, to the best of applicants' knowledge, no practical absorption system or process was known which could be used with water as a refrigerant to permit heat rejection directly to air, in spite of the fact that a vast number of absorbent-refrigerant combinations had been suggested and some tested by the refrigeration industry over a considerable period and in spite of the fact that the gas industry for many years had been assisting and urging the refrigeration industry to find such a combination. (See, for example, the articles entitled, "Refrigerants and Absorbents," by Dr. W. R. Hainsworth, parts I and II of which are published in the August and September 1944 issues of "Refrigerating Engineering" at pages 97 thru 100, and pages 201 thru 205 of that publication. See also, Research Bulletin 14, entitled "The Absorption Cooling Process," published in 1957 by the Institute of Gas Technology and sponsored by The General Research Planning Committee of the American Gas Association.)

Accordingly, it is a principal object of this invention to provide absorption refrigeration system and processes for operation with high temperature heat sinks such as air.

It is a further object of this invention to provide a refrigerant-absorbent combination which permits operation of an absorption-refrigeration system and process at an evaporator temperature of about 40° F. and at absorber temperatures above about 130° F.

It is a further object of this invention to provide a refrigerant absorbent composition which will not be subject to crystallization when the absorber is cooled by a relatively high temperature heat sink such as is encountered in a system which is directly cooled by air.

It is another object of the invention to provide an absorbent composition which is stable, and non-toxic, and which has a low vapor pressure, and low viscosity at operating temperatures.

It is another object of this invention to provide an improved absorbent composition comprising an aqueous solution of lithium bromide and lithium iodide, wherein the weight of lithium bromide is about 0.01 to 0.94 times the weight of lithium iodide.

It is another object of this invention to provide an improved absorbent composition comprising an aqueous solution of lithium bromide, lithium iodide, and ethylene glycol in the proportions hereinafter described and claimed.

It is a further object of this invention to provide an absorption refrigeration system employing in combination an absorption refrigeration apparatus with a novel refrigerant absorbent composition.

It is also an object of the present invention to provide a novel process for producing refrigeration employing a refrigerant absorbent compositions of the present invention.

Other objects and advantages of this invention will be apparent as the specification proceeds to describe the invention with reference to the accompanying drawings in which.

Figure 1:
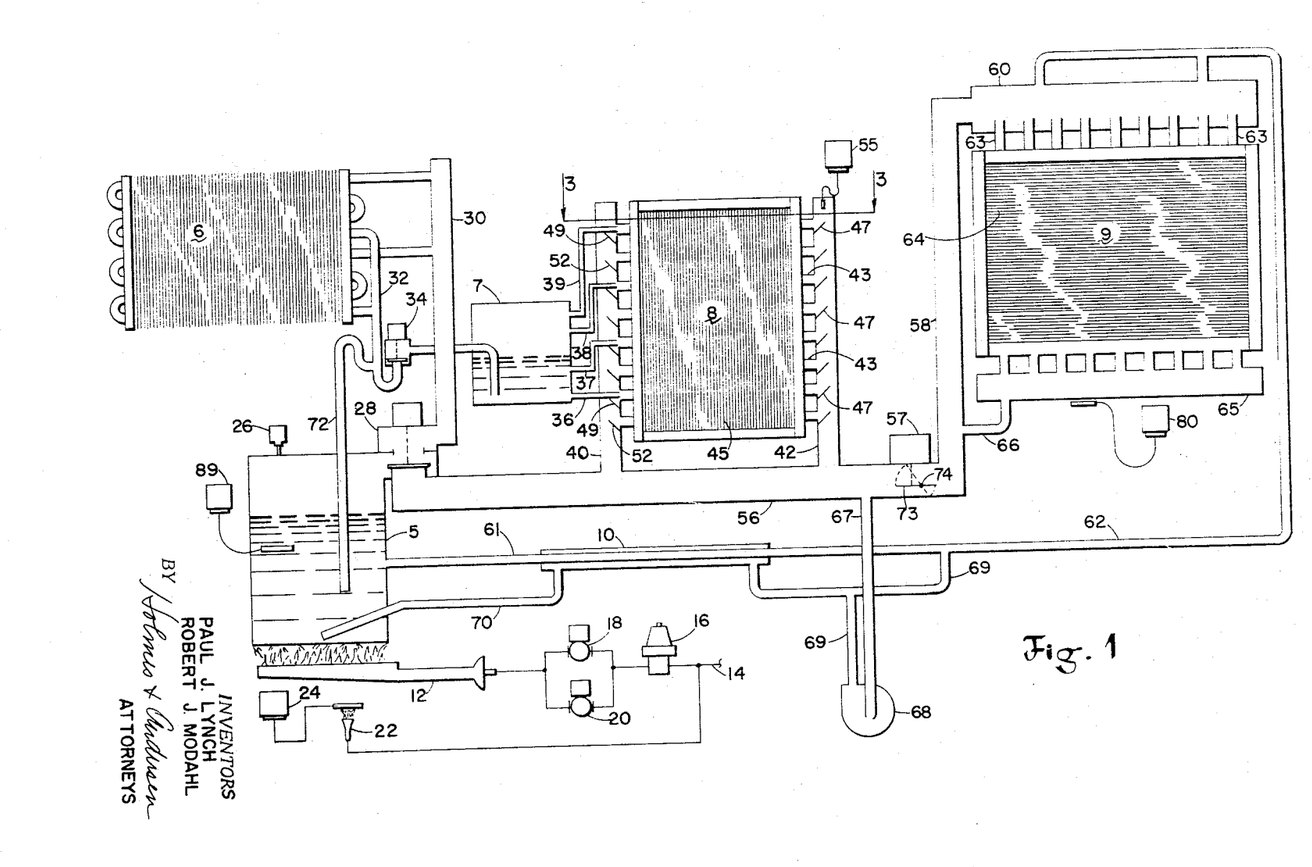
FIGURE 1 shows more or less diagrammatically a system incorporating one embodiment of an absorption refrigeration apparatus eminently satisfactory for use in our invention and showing operation during the cooling cycle.
Figure 2:
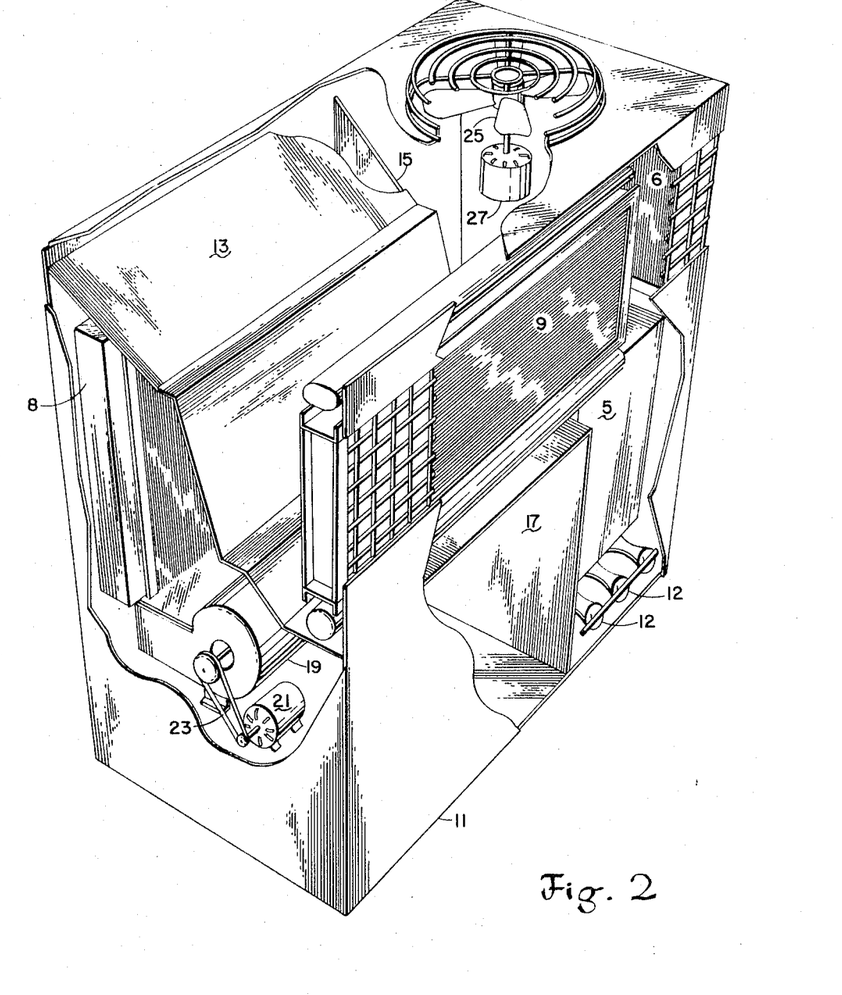
FIGURE 2 is a perspective view of the apparatus referred to in FIGURE 1 and showing the arrangement of the components of the apparatus with portions of the cabinet broken away to more clearly show the interior construction.

Referring now to FIGURE 1, one form of absorption refrigeration apparatus which is highly satisfactory for use in the systems of the present invention is shown applied to an operation having a cooling cycle for cooling air in the summer and having a heating cycle for heating air in the winter. As shown in FIGURES 1 and 2, the apparatus comprises generally a generator 5, a condenser 6, a receiver 7, an evaporator 8, an absorber 9 and a heat exchanger 10, all interconnected to provide paths of flow for the circulation of refrigerant and absorbent through the apparatus in closed circuits.

Evaporator 8 is a heat exchange coil which operates as an evaporator during the cooling cycle and as a heater during the heating cycle. For purposes of explanation it will be referred to as an evaporator.

As shown in FIGURE 2, a unit casing 11 has partitions 13, 15, and 17 which divide the interior of the casing into a first compartment and a second compartment. The first compartment contains the receiver 7, the evaporator 8, an evaporator fan 19 and a motor 21 for driving the evaporator fan through a belt 23. Air to be conditoned flows from the conditioned space into the casing through evaporator 8, then through fan 19 which discharges the air from casing 11 to the conditioned space.

The second compartment in the casing 11 contains the generator 5, the condenser 6, the absorber 9, and a motor driven fan 25. Fan 25 forces air from the second compartment of casing 11 thus drawing in air through condenser 6 and absorber 9 to cool the same. The generator receives air from the second compartment of casing 11 and discharges flue gas a a point just below fan 25.

COOLING CYCLE

The operation of the apparatus will first be described with reference to the cooling cycle.

Generator 5 is heated by a burner 12 to vaporize refrigerant from the absorbent. Burner 12 receives gas from a source 14. A pressure regulator 16 reduces the pressure to the desired pressure. A relatively small solenoid gas valve 18 provides for flow of gas for low capacity operation as for instance 25% of full capacity. A relatively larger solenoid valve 20 provides for a greater flow of gas or 75% of full capacity operation so that when both valves are open the system operates at full capacity. A pilot 22 burns continuously for lighting the burner 12. A safety pilot thermostatic switch 24 is provided to prevent starting operation if the pilot is not burning.

A high pressure switch 26 senses pressure in the generator 5 and terminates operation when the pressure in the generator exceeds a predetermined value due to some malfunction.

Refrigerant vapor produced in the generator 5 passes to a three-way solenoid valve 28 which in its normally closed position passes the vapor to a conduit 30 which conducts the vapor to a condenser 6 which transfers heat to an air stream as will be described more fully.

From condenser 6, condensed refrigerant flows through conduit 32 to a solenoid operated valve 34. During cooling operation valve 34 is open and conducts refrigerant liquid to a receiver 7. A plurality of conduits 36, 37, 38, and 39 conduct refrigerant liquid from receiver 7 to evaporator 8. Conduits 36, 37, 38 and 39 are spaced vertically so that as the level rises in receiver 7, additional conduits conduct refrigerant liquid to the evaporator.

Evaporator 8 has a supply header 40 and a return header 42. A first vertical row of horizontal tubes 43 extend between headers 40 and 42 and a second vertical row of horizontal tubes 44 extend between headers 40 and 42. Heat transfer fins 45 are secured to the tubes 43 and 44.

Figure 3:
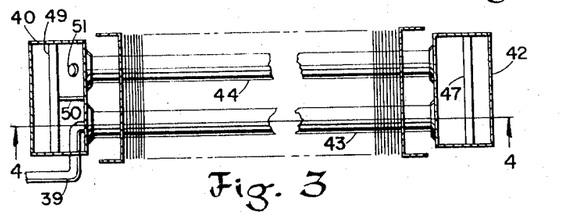
FIGURE 3 is an enlarged sectional view of the evaporator taken on line 3—3 of FIG. 1.
Figure 4:
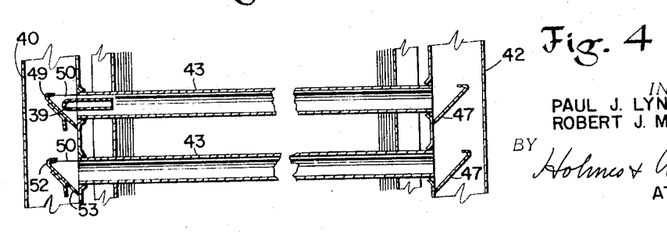
FIGURE 4 is an enlarged vertical sectional view of the evaporator taken on line 4—4 of FIGURE 3.

As shown in FIGURES 3 and 4, the refrigerant liquid flowing in conduit 39 is discharged into a first tube 43 from which it flows into a tray 47 in header 42. The refrigerant vapor generated during the passage of the refrigerant through the first tube 43 passes downwardly through header 42.

Refrigerant liquid in tray 47 passes in a return path through a tube 44 into a tray 49 having a dam 50. Refrigerant vapor generated in tube 44 passes downwardly through header 40 and the remaining refrigerant liquid flows through drain hole 51 in tray 49 to the next lower tray 52 which is similar to tray 49 except that the drain hole 53 is on the opposite side of dam 50. From this lower tray 52 the refrigerant liquid flows through a tube 44 to a tray 47 and thence through a tube 43 to tray 52. If any refrigerant liquid remains after passing through the circuit of four tubes, it flows through hole 53 into the next lower circuit of four tubes.

Conduits 36, 37, and 38 each supply a circuit of four tubes in a manner similar to that described with reference to tube 39.

A low temperature thermostatic switch 55 opens when the temperature goes below 35° F.

The refrigerant vapor in headers 40 and 42 flows into conduit 56 and through a normally open solenoid valve 57 of the pivoted vane type which is open during the cooling cycle. From valve 57 the refrigerant vapor flows through conduit 58 into the supply header 60 of absorber 9.

The previously described flow of refrigerant vapor from the generator 5 is effective in maintaining a concentrated solution of absorbent in the generator 5. This concentrated absorbent solution flows from generator 5 through conduit 61 to heat exchanger 10 in which it exchanges heat with dilute solution flowing from the absorber 9 to the generator 5. The cooled concentrated solution flows from heat exchanger 10 through conduit 62 to header 60 of absorber 9.

The absorbent solution in header 60 overflows into absorber tubes 63 and flows in a film down the inside surfaces thereof. The refrigerant vapor also flows downwardly in absorber tubes 63 and is absorbed by the film of absorbent on the inside surface of the tubes. Heat transfer fins 64 are secured on the tubes 63 and is old and well known. Fan 25 draws air through the absorber 9 to remove heat therefrom.

The solution flows from tubes 63 into a return header 65 from which it flows successively through conduit 66, conduit 58, valve 57 and into conduit 56. From conduit 56 the solution flows through conduit 67 to pump 68. The solution from the discharge of pump 68 flows in part through conduit 69 into conduit 62 and to the absorber 9 and in part through heat exchanger 10 and thence through conduit 70 into the lower portion of generator 5 to be reconcentrated.

Solution concentration is reduced as the load is reduced so that dilution of the absorbent solution is not necessary when the machine is shut off after low load operation. If there is a power failure, motors 21 and 27 of fans 19 and 25 stop, solution pump 68 stops and gas valves 18 and 20 close. Also refrigerant liquid valve 34 closes. Refrigerant liquid flows from reservoir 7 into the evaporator 8 and thence into conduits 56 and 67 to dilute the solution draining out of the absorber 9 and thus prevent solidification of solution in these conduits.

The concentrated solution in conduit 62 and in heat exchanger 10 drains by gravity through conduit 70 to the generator 5.

HEATING CYCLE

During the heating cycle valve 34 is de-energized and therefore in closed position. The condenser 6 is exposed to outside temperature which is usually low during the heating cycle with the result that refrigerant vapor condenses therein with the result that a low pressure is created. The pressure in generator 5 is greater than the pressure in condenser 6, and therefore solution flows through conduit 72 from the generator 5 to the condenser 6 to fill the condenser with solution. This action occurs after the solution has been diluted with refrigerant from the receiver 7, and therefore the solution will not solidify at normal winter temperatures.

During the heating cycle valve 28 is open between the generator 5 and conduit 56 to pass steam to conduit 56. From conduit 56 the steam flows to evaporator headers 40 and 42 and thence to evaporator tubes 43 and 44. It is thus seen that evaporator 8 operates as a heating coil to heat the air of the conditioned space. The steam condensate flows downwardly through headers 40 and 42 via trays 47, 49, and 52 and thence into conduit 56 from which it flows successively to conduit 67, pump 68, heat exchanger 10, conduit 70 and generator 5.

With valve 57 closed and absorber 9 exposed to a low outside ambient temperature, condensation of vapor takes place in the absorber 9 and a low pressure is created with the result that absorbent solution flows through conduit 62 to fill the absorber 9 with solution thus preventing freezing in the absorber 9. This action occurs after the solution has been diluted with refrigerant from the receiver 7, and therefore the solution will not solidify at normal winter temperatures.

If for some reason the pilot 22 should become extinguished in freezing weather, the condensate returning to the concentrator via conduit 67, pump 68, heat exchanger 10 and conduit 70 might freeze in spite of the fact that these passageways are insulated. To prevent this we construct the solenoid valve 57 in a particular manner as will now be described. The blade 73 has a pivot 74 which is offset with respect to the axis of conduit 56 with the result that a column of liquid in conduit 58 would act against a larger area with a force tending to open the vane 73 and against a smaller area with a force tending to hold the vane 73 closed. The solenoid is provided with insufficient power to hold the vane 73 in closed position against the force of the column of liquid in the absorber 9 when the pressures of the evaporator and condenser decrease with temperature due to loss of heat from pilot 22. The solution released from absorber 9 will force the refrigerant liquid in conduit 67, pump 68, heat exchanger 10 and conduit 70 into the generator 5 and mix with any remaining liquid refrigerant thereby preventing destructive freezing in these spaces.

CONTROLS

Figure 5:
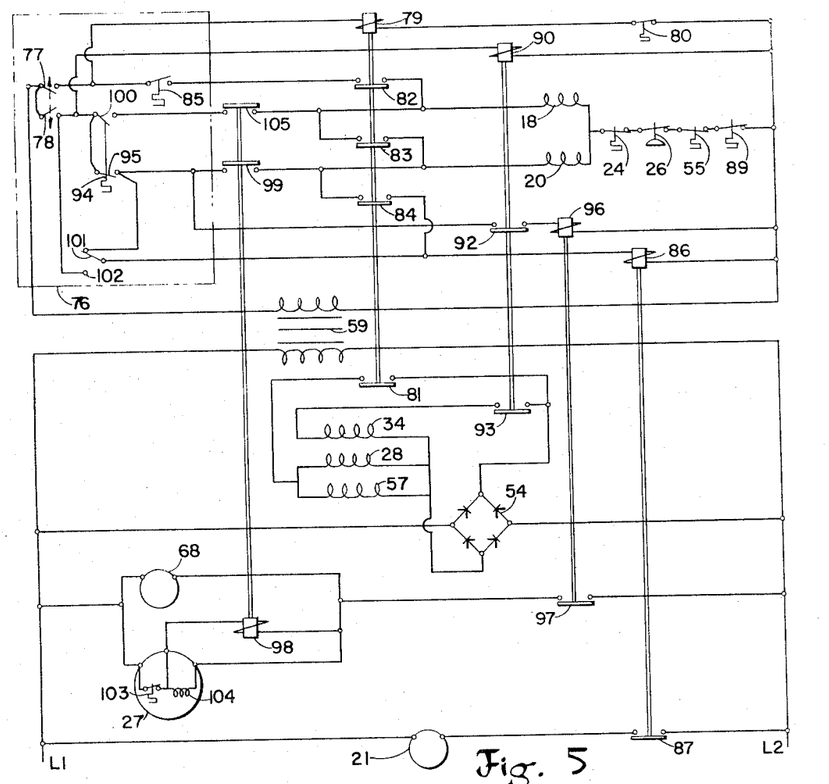
FIGURE 5 is a diagram showing the controls of our invention.

The control system will now be described with reference to FIGURE 5. A source of alternating current indicated by lines L1 and L2 powers the controls. A rectifier 54 furnishes a source of direct current for the solenoid valves 28, 34, and 57. A transformer 59 furnishes reduced voltage for some controls.

A selective controller 76 is preferably mounted in the unit at a location where it is exposed to the temperature of the space conditioned by the unit. A heating and cooling selector has a heating switch 77 and a cooling switch 78.

When switches 77 and 78 are both open, valves 28, 34, and 57 are de-energized; the evaporator fan motor 21, the absorber-condenser fan motor 27, and the pump 68 are de-energized, and gas valves 18 and 20 are closed.

HEATING CONTROL

Let us assume now that it is desired to operate the unit for heating and that the switch 77 is closed. This energizes the heating relay 79 provided that thermostat 80 in the absorber 9 senses a temperature below 120° F. The purpose of thermostat 80 is to prevent switching immediately from cooling to heating with the attendant risk of solidifying the concentrated solution in the absorber 9. Energization of the heating relay 79 closes contact 81 to energize solenoid valve 28 and solenoid valve 57. Contacts 82, 83 and 84 are also closed so that when the heating thermostat 85 closes and demands heat, the gas valves 18 and 20 are energized to open position, and the evaporator fan solenoid 86 is energized to close contact 87 and start the evaporator fan motor 21.

There are certain safety devices which will prevent the gas valves 18 and 20 from being energized to open position. The safety pilot thermostat 24 prevents energization of the gas valves if the pilot 22 is not burning. The high pressure switch 26 also prevents energization if the pressure in the generator 5 is excessive. The low temperature thermostat 55 in the evaporator opens and prevents operation when the temperature of the evaporator is below 35° F. The high temperature thermostat 89 in the generator 5 opens above 300° F. and de-energizes gas valves 18 and 20 to closed position.

COOLING CONTROL

Let us assume now that it is desired to operate the unit for cooling and that switch 78 is closed. This energizes cooling relay 90 which closes contact 92 and also contact 93 to energize valve 34 to open position for flow of refrigerant liquid from condenser 6 to receiver 7. If the temperature of the conditioned space rises slightly above the desired predetermined temperature, cooling thermostat 94 closes contact 95 to energize absorber condenser fan relay 96 which closes absorber condenser fan contact 97 to energize pump 68, relay 98, and the absorber condenser fan motor 27.

Energization of relay 98 closes contacts 99 and 105. With switch 95 and contact 99 closed, gas valve 20 is energized to open position and low capacity cooling operation is obtained.

If the temperature of the conditioned space rises further above the desired predetermined temperature, cooling thermostat 94 closes switch 100 and gas valve 18 is energized to open position to operate the unit at full capacity. As the temperature falls toward the desired predetermined temperature gas valve 18 is first de-energized to reduce the operation to low capacity and when the conditioned space reaches the desired predetermined temperature gas valve 20 is de-energized to terminate the cooling operation.

A switch 101 may be in the position shown to operate the evaporator fan when the system is operating on the cooling cycle. If it is desired to operate the evaporator fan when the unit is on the cooling cycle but not operating, switch 101 may be moved to contact 102 to energize the evaporator fan motor 21 in order to circulate the air in the conditioned space.

The absorber condenser fan motor 27 has a thermostat 103 in series with the motor winding 104 and the relay 98. If the temperature of the motor 27 exceeds a predetermined value, thermostat 103 opens to de-energize the motor winding 104 and de-energize relay 98 which causes contacts 99 and 105 to open and de-energize gas valves 18 and 20 into closed position.

ABSORBENT COMPOSITIONS OF
THE INVENTION

Figure 6:
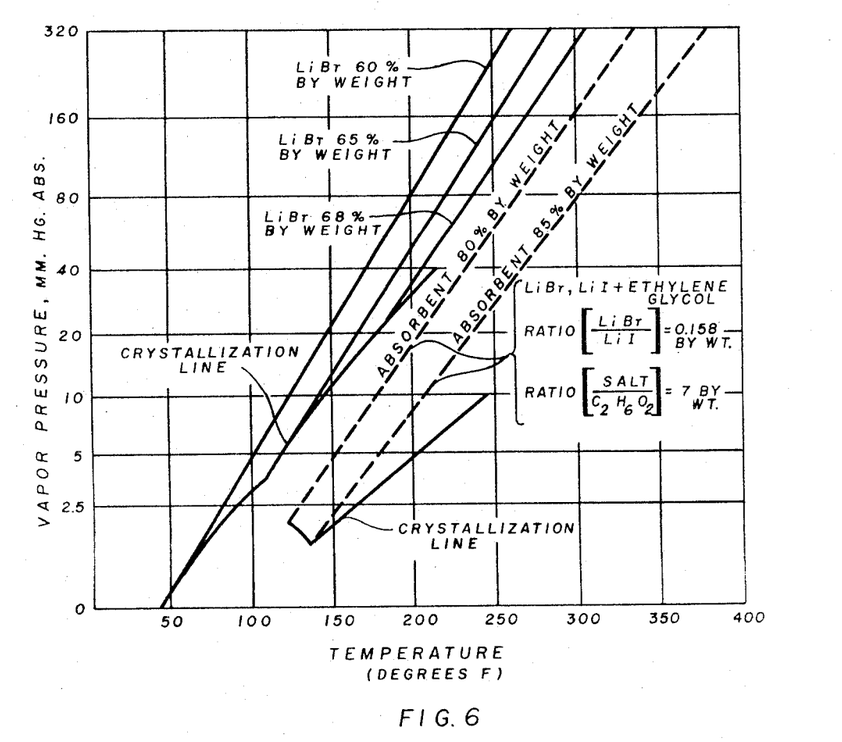
FIGURE 6 shows a crystallization curve and some vapor pressure curves for certain of our improved absorbent compositions and for certain compositions of lithium bromide and water ($LiBr-H_2O$)

Referring now to FIGURE 6, the four curves marked LiBr 60%, 65%, and 68% by weight, and LiBr crystallization line, illustrate the fact that it is impractical to operate an absorption refrigeration process at temperatures above about 125° F. with absorption refrigerating machines which employ lithium bromide and water solutions as the refrigerating-absorbent combination and which must maintain refrigerating temperatures of about 40° F. in the evaporator.

To maintain an evaporator temperature of about 40° F., it is necessary to have a vapor pressure of about 6mm. Hg absolute, which is the approximate vapor pressure of water at 40° F. As hereinabove explained, for air conditioning equipment, the absorbent composition must be able to maintain a vapor pressure less than that of water at 40° F. If one attempts to operate with an absorber having a temperature as high as 125° F. with aqueous solutions of lithium bromide, it can be seen from FIGURE 6 that the operation would be very close to the crystallization line. This is impractical since crystallization resulting in high viscosity and freezing of the solution or clogging of the apparatus is very likely to occur.

Referring again to FIGURE 6, the curves marked "Absorbent 80% by Weight" and "Absorbent 85% by Weight," and their accompanying curve marked "Crystallization Line," illustrate the fact that these examples of our improved absorbent composition are capable of maintaining a vapor pressure less than that of water at 40° F. even when the temperature of the absorbent solution in the absorber is as high as 150° F. to 170° F. For convenience, the ingredients of these particular examples of our improved absorbent and the ratios of the ingredients are also marked on FIGURE 6. The absorptive ability of our improved absorbent composition at such high temperatures, makes practical the dissipation of heat directly to an air sink.

In interpreting curves such as shown in FIGURE 6 and FIGURES 7 through 11 in this application, the following principle, which was published and well known long prior to applicants' work, should be kept in mind. The greater the number of molecules (moles) dissolved in the absorbent solution, the greater is the lowering of the vapor pressure of the absorbent solution. The lower the vapor pressure of the absorbent solution, the greater is the absorbent capacity or affinity of the absorbent solution for the refrigerant vapors. Consequently, the molecular weight of an absorbent must be considered as much as its weight percent concentration in the absorbent solution. For example, the molecular weight of lithium bromide is about 87 and that of lithium iodide about 134. Thus, a 65 weight percent lithium bromide-water solution contains more molecules of absorbent than 72 weight percent lithium iodide-water solution. This is one of the reasons why, prior to our work, lithium bromide was used commercially whereas lithium iodide was not.

Figure 7:
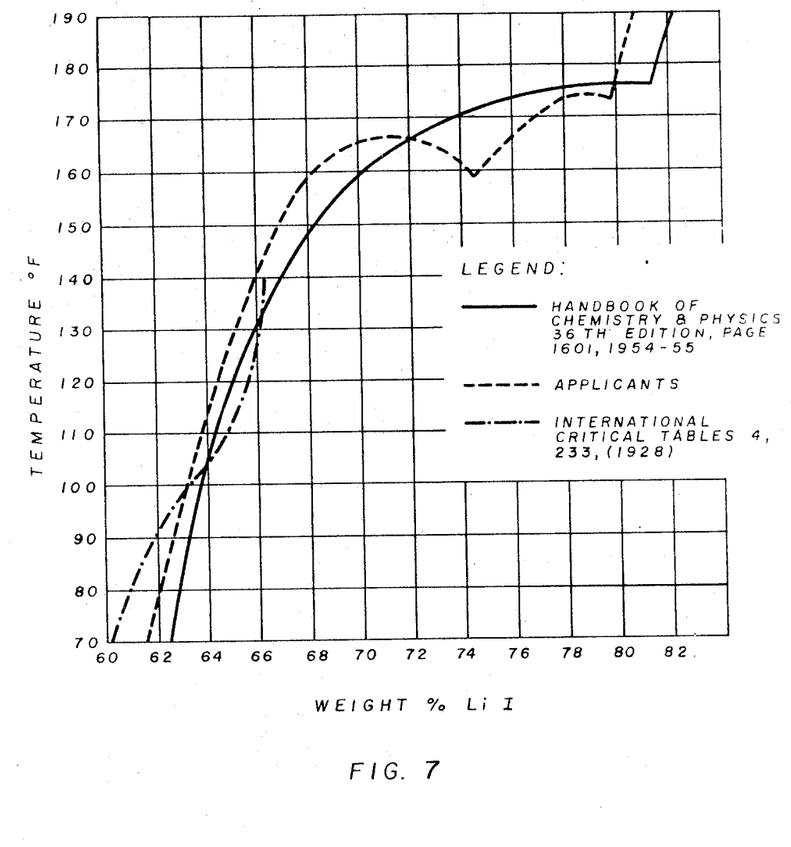
FIGURE 7 shows crystallization curves illustrating weight percent against temperature for lithium iodide and water, two of the curves being made from prior published data, and one of them made from data obtained in our tests.

Applicants, in searching for some refrigerant-absorbent combination that might permit an absorption refrigeration process to dissipate heat directly to air as a heat sink, selected water for the refrigerant because of its known advantages, and elected to test with water many different absorbents including some previously tested and discarded by others on the basis of the data previously obtained. In the course of applicants' research, the first encouragement came when they tested a solution of lithium iodide with great care and obtained data differing, as illustrated in FIGURE 7, from previously published data. FIGURE 7 shows three curves. The curve drawn with a solid line is based on data reported at page 1601 of the 1954–5 publication entitled, "Handbook of Chemistry & Physics," 36th ed. The curve drawn with a dash-dot line is based on data the International Critical Tables 4,233 published in 1928. The third curve is based on data obtained in applicants' research work which they believe to be more complete and accurate than prior data. Applicants noted that their data showed the curve had a surprising and unexpected dip or dent in it between 71% and 78% by weight of lithium iodide. This suggested that lithium iodide might have useful properties for absorption of water at high temperatures.

Figure 8:
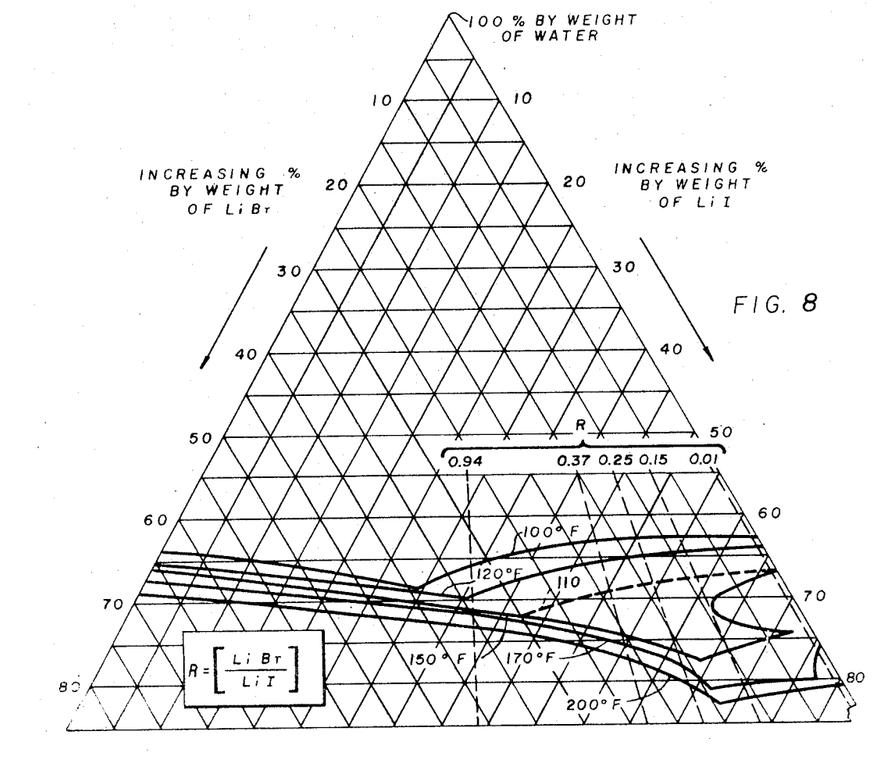
FIGURE 8 shows certain isothermal crystallization curves for compositions of lithium bromide, lithium iodide and water ($LiBr-LiI-H_2O$) made from data obtained in our tests.

This led applicants in the course of further work to determine data for a series of isothermal crystallization curves of aqueous absorbent solutions containing lithium bromide and lithium iodide in various proportions. The results of such tests are illustrated in FIGURE 8, a triangular coordinate chart, in which the crystallization line at 150° F. is most significant, because of the unusual and unexpected shape of the curve. The break in the LiBr-LiI-H$_2$O curve for 150° F. is attributable in part to the surprising dip or dent which applicants discovered in the lithium iodide water curve discussed above and shown in FIGURE 7. The bending in the crystallization curve at 150° F. allows a larger area for the existence of solutions which do not freeze above 150° F. than would have been possible if the regularity of the other lower temperature curves had been followed. This result could not be predicted from the lower temperature crystallization curves shown in FIGURE 8. They suggest that the 150° F. crystallization line would probably continue on the dash line 110 of FIGURE 8. The 170° F. and 200° F. curves in FIGURE 8 illustrate the fact that even higher temperatures and concentrations of the lithium bromide-lithium iodide absorbent might be used if needed.

An investigation was made of a lithium bromide-ethylene glycol-water (LiBr-C$_2$H$_6$O$_2$-H$_2$O) system. It was found that this system produced lower total vapor pressures of water above the solutions at lower concentrations of lithium bromide or allowed the use of higher concentrations of lithium bromide to be used at higher temperatures without danger of crystallization.

However, the viscosity of such solutions was very high even at 150° F., and for this reason this system was not practical.

Figure 9:
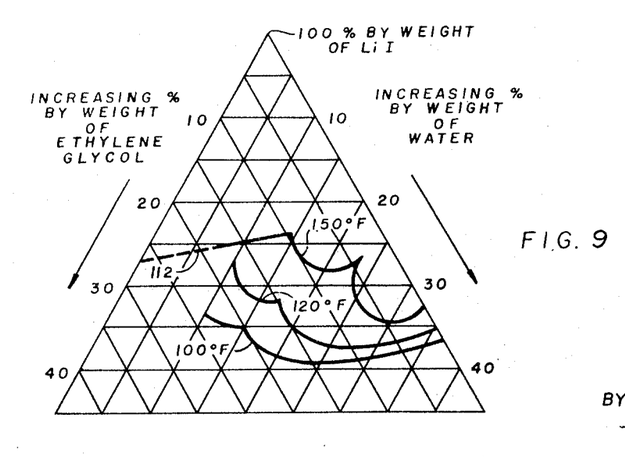
FIGURE 9 shows isothermal crystallization curves for certain compositions of lithium iodide, ethylene glycol and water ($LiI-C_2H_6O_2-H_2O$) made from data obtained in our tests.

An investigation was also made on the lithium iodide, ethylene glycol and water ($LiI-C_2H_6O_2-H_2O$) system. The results of this investigation are shown in FIGURE 9. The test at 150° F. was not extended to the composition having no water; however, the reasonable assumption was made that the curve extends along dotted line 112 and that the 120° F. and the 100° F. curves follow substantially the same pattern. These curves show that the solubility of lithium iodide in ethylene glycol-water solutions can be greater than that of lithium iodide in water. The curves also indicate a higher solubility for lithium iodide in pure ethylene glycol than for lithium iodide in pure water.

Figure 10:
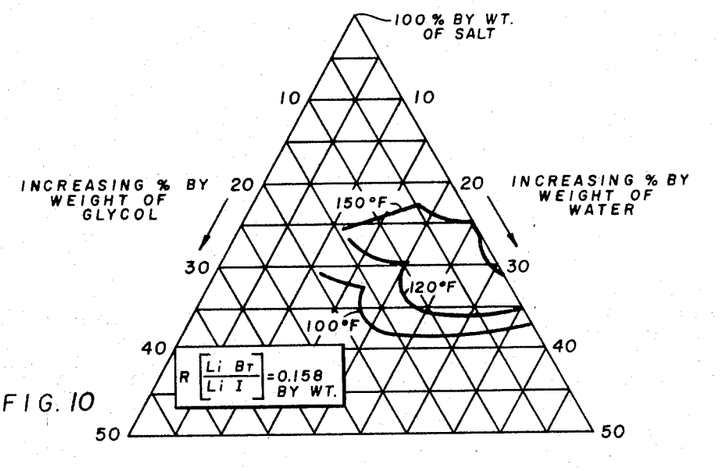
FIGURE 10 shows isothermal crystallization curves obtained from our test data for certain compositions of lithium bromide, lithium iodide, ethylene glycol, and water ($LiBr-LiI-C_2H_6O_2-H_2O$) in which the ratio of LiBr/LiI is 0.158 by weight.

Encouraged by these findings, an investigation was made of the lithium iodide, lithium bromide, ethylene glycol and water ($LiI-LiBr-C_2H_6O_2-H_2O$) system with emphasis on more complete data within the range of unusual solubility as shown in FIGURE 8 and FIGURE 9. Among the several salt ratios (LiBr/LiI) tested were 0.158 and 0.375. FIGURE 10 covers a salt solution having a ratio of LiBr/LiI by weight equal to 0.158 and FIGURE 11 covers a salt solution having a ratio of LiBr/LiI by weight equal to 0.375.

Figure 11:
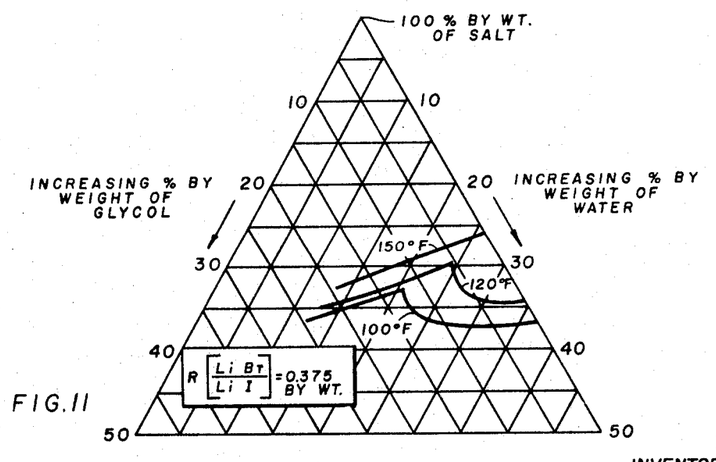
FIGURE 11 shows isothermal crystallization curves obtained from our test data for certain compositions of lithium bromide, lithium iodide, ethylene glycol, and water ($LiBr-LiI-C_2H_6O_2-H_2O$) in which the ratio of LiBr/LiI is 0.375 by weight.

The results in the case of the compositions illustrated by FIGURES 10 and 11 were very satisfactory as were also the results obtained with the lithium bromide, lithium iodide, and ethylene glycol compositions specifically designated in FIGURE 6 and in the additional examples shown in the following table.

*Examples*

| Example No. | Weight Percent | | | | Weight Ratio | | Crystallization Temp., ° F. |
|---|---|---|---|---|---|---|---|
| | LiI | LiBr | $C_2H_6O_2$ | $H_2O$ | LiBr/LiI | Total Salt/$C_2H_6O_2$ | |
| 1 | 34.8 | 32.6 | 10.6 | 22.0 | 0.941 | 6.33 | 155 |
| 2 | 50.1 | 18.8 | 13.9 | 17.2 | 0.375 | 4.95 | 147 |
| 3 | 65.7 | 10.4 | 9.50 | 14.4 | 0.158 | 8.02 | 152 |
| 4 | 64.2 | 10.2 | 5.05 | 20.6 | 0.158 | 14.7 | 143 |
| 5 | 36.5 | 34.3 | | 29.2 | 0.940 | | 147 |
| 6 | 53.9 | 20.2 | | 25.9 | 0.375 | | 152 |
| 7 | 66.0 | 10.4 | | 23.6 | 0.158 | | 155 |

As has been hereinabove explained, the applicants' improved absorbent compositions contain lithium bromide and lithium iodide. The ratio by weight of the lithium bromide to the lithium iodide should be between about 0.01 and 0.94, most advantageously between about 0.15 and 0.37; and most desirably between about 0.15 and 0.25. With such absorbent compositions, an air cooled absorber may be used in an absorption refrigeration system using water as the refrigerant.

As has been explained hereinabove, the addition of ethylene glycol to the aqueous solution of lithium bromide and lithium iodide enhances the ability of the absorbent compositions to operate in an absorption refrigeration system employing a relative high temperature heat sink, and it reduces the freezing point of the solution without incurring an unduly high viscosity. It is desirable to employ ethylene glycol in an amount whereby the combined weight of lithium bromide and lithium iodide is about 1 to 99 times the weight of ethylene glycol. Preferably, the combined weight of lithium bromide and lithium iodide may be between about 3 to 19 times the weight of ethylene glycol with the optimum being between about 5 to 12 times the weight of ethylene glycol.

It should be understood that small amounts of corrosion inhibiting substances may be added to these absorbent compositions in accordance with the usual practice in the art.

While the absorption refrigeration system of the invention has been disclosed in conjunction with a preferred absorption refrigeration apparatus, it should be understood that the absorption refrigeration compositions and methods of the invention may be employed with an absorption refrigeration system of a different design, such as those conventionally employed in absorption refrigeration.

The absorption refrigeration apparatus disclosed herein does not per se constitute a part of the present invention. Such apparatus is the invention of David Peckham and Robert G. Miner and is claimed in their United States patent application Serial No. 509,145, filed November 22, 1965.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. Absorption refrigeration system comprising, in combination, an absorption refrigeration apparatus comprising a generator, a condenser, an evaporator, and an absorber connected to form a refrigeration unit with an absorbent composition in said apparatus, said absorbent composition comprising a solution of lithium bromide and lithium iodide in water, the lithium bromide being about 0.01 to 0.94 times the weight of lithium iodide.

2. Absorption refrigeration system according to claim 1 in which the absorbent composition includes ethylene glycol and in which the combined weight of lithium bromide and lithium iodide is about 1 to 99 times the weight of ethylene glycol.

3. Absorption refrigeration system comprising, in combination, an absorption refrigeration apparatus comprising a generator, a condenser, an evaporator and an absorber connected to form a refrigeration unit with an absorbent composition in said apparatus, said absorbent composition comprising a solution of lithium bromide and lithium iodide in water, the weight of said lithium bromide being about 0.15 to 0.37 times the weight of lithium iodide.

4. Absorption refrigeration system according to claim 3 in which the absorbent composition includes ethylene glycol and in which the lithium bromide and lithium iodide is about 3 to 19 times the weight of ethylene glycol.

5. Absorption refrigeration system comprising, in combination, an absorption refrigeration apparatus comprising a generator, a condenser, an evaporator and an absorber connected to form a refrigeration unit with an absorbent composition in said system, said absorbent composition comprising a solution of lithium bromide, lithium iodide, and ethylene glycol in water in which the weight of lithium bromide is about 0.15 to 0.25 times the weight of lithium iodide and in which the combined weight of lithium bromide and lithium iodide is about 5 to 12 times the weight of ethylene glycol.

6. A method of producing refrigeration comprising the steps of passing an absorbent solution consisting essentially of lithium bromide and lithium iodide in water, the weight of lithium bromide being about 0.01 times to 0.94 times the weight of lithium iodide, to a heating zone to generate water vapor and concentrate said solution, passing the water vapor to a condensing zone in which the water vapor is condensed to liquid water by transferring heat to a heat sink, passing said liquid water to an evaporating zone, passing said absorbent solution to an absorbing zone in fluid communication with said evaporating zone and transferring heat from said absorbing zone to a heat sink while maintaining said absorbent solution in a liquid state at temperatures of about 130° F. and above to maintain an evaporator temperature of about 40° F. and passing said absorbent solution from said absorbing zone to said heating zone to be reconcentrated.

7. A method according to claim 6 in which the absorbent solution consists essentially of lithium bromide and lithium iodide in water, the weight of lithium bromide being about 0.15 to 0.37 times the weight of lithium iodide.

8. A method of producing refrigeration comprising the steps of passing an absorbent solution consisting essentially of lithium bromide, lithium iodide and ethylene glycol in water, in which the weight of lithium bromide is about 0.01 times to 0.94 times the weight of lithium iodide, and in which the combined weight of lithium bromide and lithium iodide is about 1 to 99 times the weight of ethylene glycol, to a heating zone to generate water vapor and concentrate said solution, passing the water vapor to a condensing zone in which the water vapor is condensed to liquid water by transferring heat to a heat sink, passing said liquid water to an evaporating zone, passing said absorbent solution to an absorbing zone in fluid communication with said evaporating zone and transferring heat from said absorbing zone to a heat sink while maintaining said absorbent solution in a liquid state at temperatures of about 130° F. and above to maintain an evaporator temperature of about 40° F. and passing said absorbent solution from said absorbing zone to said heating zone to be reconcentrated.

9. A method according to claim 8 in which the absorbent solution consists essentially of a solution of lithium bromide, lithium iodide and ethylene glycol in water, in which the weight of lithium bromide is about 0.15 to 0.25 times the weight of lithium iodide and in which the combined weight of lithium bromide and lithium iodide is about 5 to 12 times the weight of ethylene glycol.

10. An absorbent composition for use in an absorption refrigeration system using water as a refrigerant comprising lithium bromide, lithium iodide and ethylene glycol in which the weight of lithium bromide is about 0.01 to 0.94 times the weight of lithium iodide and in which the combined weight of lithium bromide and lithium iodide is about 1 to 99 times the weight of ethylene glycol.

11. An absorbent composition for use in an absorption refrigeration system comprising a solution of lithium bromide, lithium iodide and ethylene glycol in water, the weight of said lithium bromide being about 0.01 to 0.94 times the weight of lithium iodide and the combined weight of lithium bromide and lithium iodide being about 1 to 99 times the weight of ethylene glycol.

12. An absorbent composition for use in a refrigeration system comprising a solution of lithium bromide, lithium iodide, and ethylene glycol in water in which the weight of lithium bromide is about 0.15 to 0.37 times the weight of lithium iodide and in which the combined weight of lithium bromide and lithium iodide is about 3 to 19 times the weight of ethylene glycol.

13. An absorbent composition for use in a refrigeration system comprising a solution of lithium bromide, lithium iodide, and ethylene glycol in water in which the weight of lithium bromide is about 0.15 to 0.25 times the weight of lithium iodide and in which the combined weight of lithium bromide and lithium iodide is about 5 to 12 times the weight of ethylene glycol.

References Cited by the Examiner

UNITED STATES PATENTS

| | | | |
|---|---|---|---|
| 3,081,605 | 3/1963 | Leonard | 62—112 X |
| 3,200,604 | 8/1965 | Greeley et al. | 62—112 X |

OTHER REFERENCES

Hainsworth: "Refrigerants and Absorbents," Refrigerating Engineering, volume 48, page 205 (September 1944).

Chemical Abstracts, volume 57, column 9280d (1964).

LLOYD L. KING, *Primary Examiner.*